United States Patent [19]
Kozak, III; Andrew F.

[11] Patent Number: 5,464,529
[45] Date of Patent: Nov. 7, 1995

[54] APPARATUS AND METHOD FOR SEPARATION OF LIQUIDS

[75] Inventor: Andrew F. Kozak, III, Media, Pa.

[73] Assignee: Triton Environmental Corporation, Lancaster, Pa.

[21] Appl. No.: 119,352

[22] Filed: Sep. 9, 1993

Related U.S. Application Data

[63] Continuation-in-part of Ser. No. 975,613, Nov. 19, 1992, Pat. No. 5,304,303, which is a continuation-in-part of Ser. No. 816,126, Dec. 31, 1991, abandoned.

[51] Int. Cl.$^6$ ..................................................... C02F 1/40
[52] U.S. Cl. .......................... 210/104; 210/110; 210/519; 210/532.1; 210/540
[58] Field of Search .................................... 210/104, 110, 210/109, 134, 242.3, 253, 257.1, 258, 259, 262, 512.1, 513, 519, 521, 532.1, 538, 540, 741, 744, 923, 537

[56] References Cited

U.S. PATENT DOCUMENTS

| | | | |
|---|---|---|---|
| 156,751 | 11/1874 | Bates | 210/540 |
| 1,958,054 | 5/1934 | Linnmann, Jr. | 210/572.1 |
| 2,180,811 | 11/1939 | King | 210/512.1 |
| 3,532,219 | 10/1970 | Valdespino | 210/242.3 |
| 3,618,768 | 11/1971 | Brown | 210/923 |
| 3,762,548 | 10/1973 | McCabe | 210/540 |
| 3,812,970 | 5/1974 | Yamaznki | 210/519 |
| 4,108,773 | 8/1978 | Mercaliso | 210/242.3 |
| 4,111,806 | 9/1978 | Wright et al. | 210/540 |
| 4,111,809 | 9/1978 | Pichon | 210/923 |
| 4,198,300 | 4/1980 | Williams | 210/170 |
| 4,251,081 | 4/1979 | Bolli et al. | 210/923 |
| 4,252,649 | 2/1981 | Favret, Jr. | 210/538 |
| 4,554,074 | 11/1985 | Broughton | 210/519 |
| 4,619,771 | 10/1986 | Stall et al. | 210/517 |
| 4,720,341 | 1/1988 | Arnold | 210/540 |
| 4,795,567 | 1/1980 | Simpson et al. | 210/540 |
| 4,802,978 | 2/1981 | Schmit et al. | 210/540 |
| 4,804,471 | 2/1989 | Velisavijevic | 210/540 |
| 4,816,146 | 3/1989 | Fibertler | 210/522 |
| 4,938,878 | 7/1990 | Hall | 210/540 |
| 5,030,342 | 7/1991 | Ortega | 210/242.3 |
| 5,076,915 | 12/1991 | Rose | 210/540 |

FOREIGN PATENT DOCUMENTS 1385323  2/1975  United Kingdom.

*Primary Examiner*—Christopher Upton
*Attorney, Agent, or Firm*—Robert S. Lipton; Lipton & Stapler

[57] ABSTRACT

A generally vertical tube communicates at its lower end with a reservoir containing the heavier of two liquids to be separated (water in the case of oil and water separation). A vacuum system is used to create at the top of this tube a lower pressure than at the bottom. The mixture of the liquids to be separated is injected into the tube at an intermediate location between top and bottom with relatively low velocity and turbulence, and close to, but below the level of the interface between the two liquids, which becomes established as they separate. The interface level location is maintained by controlling the top-to-bottom pressure difference and the evacuation rate of the lighter liquid.

14 Claims, 4 Drawing Sheets

APPARATUS AND METHOD FOR SEPARATION OF LIQUIDS

This is a continuation-in-part of U.S. patent application No. 07/975,613, filed Nov. 12, 1992, now Pat. No. 5,304,303, issued Apr. 19, 1994, which is a continuation-in-part of U.S. patent application Ser. No. 07/816,126, filed Dec. 31, 1991, abandoned.

BACKGROUND OF THE INVENTION

The invention relates to an apparatus and method for separating liquids.

It is generally recognized that there is often a need to separate, from each other, liquids which have significantly different properties, but which have become physically intermixed. This need arises, for example, with respect to various environmental problems. Hazardous liquids, such as oil, frequently become mixed with water found in the same environment. This then requires the separation of the oil from the water so that its presence may be eliminated as a hazard to the environment.

A wide variety of methods and apparatus have heretofore been proposed to provide an efficient means for removing oil or other liquid contaminants from water, but have met with little success. Recent methods of dealing with the problem of oil pollution include chemical dispersant, as well as various other methods for separating the oil from the water. For instance, U.S. Pat. No. 4,108,773, of Macaluso issued Aug. 22, 1978, teaches an oil salvaging apparatus comprising a chamber into the base of which oil-contaminated seawater is charged for separation of the liquids based on their different densities. However, the Macaluso technique, like many others, suffers from significant shortcomings.

Thus, in Macaluso, water is removed from the chamber in which separation is intended to take place by means of a pump. The outflow velocity of the water, therefore, will exceed the buoyancy force of the oil initially in mixture with the water. This counteracts the oil's ascent to the top of the chamber and instead, causes at least some of the oil to be discharged along with the water. Further, the Macaluso patent discloses no means for effectively regulating the contaminated water's injection rate, and the chamber will only support a predetermined weight of water under vacuum. Therefore, the injection rate may become excessive and this will result in the discharge of unseparated oil and water, either through the chamber's top oil evacuation conduit or out of its lower submerged end.

In general, the prior art techniques of separating liquids fail to take advantage of related fundamental fluid dynamics and separation principles and, therefore, are unable to achieve superior separation rates which are both measurable and predictable. Furthermore, prior art separation techniques are often incapable of assuring qualitatively acceptable end-products.

Other methods involve the use of skimmers, surface guides and the like to channel the surface oil to a location where it can be removed by pumps. However, in such methods, some water is usually removed with the oil.

In many cases, the oil is present in a thin layer, making it particularly difficult to remove without also removing water. Indeed, in such cases, large amounts of water must be processed, in order to separate relatively small quantities of oil.

Accordingly, it is an object of the present invention to provide an apparatus and method for overcoming some of the shortcomings of prior art liquid separation techniques.

It is another object to provide an apparatus and method to accomplish separation of different liquids in an improved manner.

It is still another object to accomplish such separation at controlled rates.

It is still another object to accomplish such separation with greater efficiency and reliability.

These and other objects which will appear are achieved in accordance with the present invention as follows.

SUMMARY OF THE INVENTION

The present invention includes a generally vertical tube, the lower end of which communicates with a reservoir containing the heavier of two liquids to be separated (water in the case of oil and water separation). A vacuum system is used to create at the top of this tube a pressure which is lower than that at the bottom, and the mixture of the liquids to be separated (oil and water) is injected into the tube. The lighter liquid (oil) tends to rise toward the top of the tube; the heavier liquid (water) tends to descend toward the bottom of the tube. Thus, there forms in the tube a column of liquid supported by the reduced pressure at the top, with the heavier liquid (water) tending to accumulate in the lower portion of the liquid column and the lighter liquid (oil) in the upper portion. As mixture continues to be injected, liquid in the lower liquid portion will be displaced and flow into the reservoir, while accumulating liquid in the upper portion is withdrawn near the top of the tube.

So far, the apparatus and method of the invention are similar to some prior art arrangements. However, unlike the prior art, in accordance with the present invention the injection of the mixture is performed at an intermediate location between the top and bottom of the tube, with relatively low velocity and turbulence, and at a location relatively close to, but below the level of the interface between the two liquids, which becomes established as these liquids separate inside the tube. A system is provided for controlling the location of this interface level so as to substantially maintain the above-mentioned relationship between that level and the mixture injection height.

The tube preferably extends as far as possible in both directions from the controlled interface level.

The segment of the vertical tube in which the mixture injection takes place and in which the interface level is maintained is preferably substantially wider than the remainder of the tube. Also, screens are preferably provided at the mixture injection nozzles and these nozzles are preferably pointed so as to inject the liquid mixture at an upward angle into the wider tube segment.

As will be seen from subsequent discussion, these measures all contribute in one way or another to the overall performance.

For further details, reference is made to the following description taken in light of the accompanying drawings.

DESCRIPTION OF THE PREFERRED EMBODIMENTS

Figure 1:
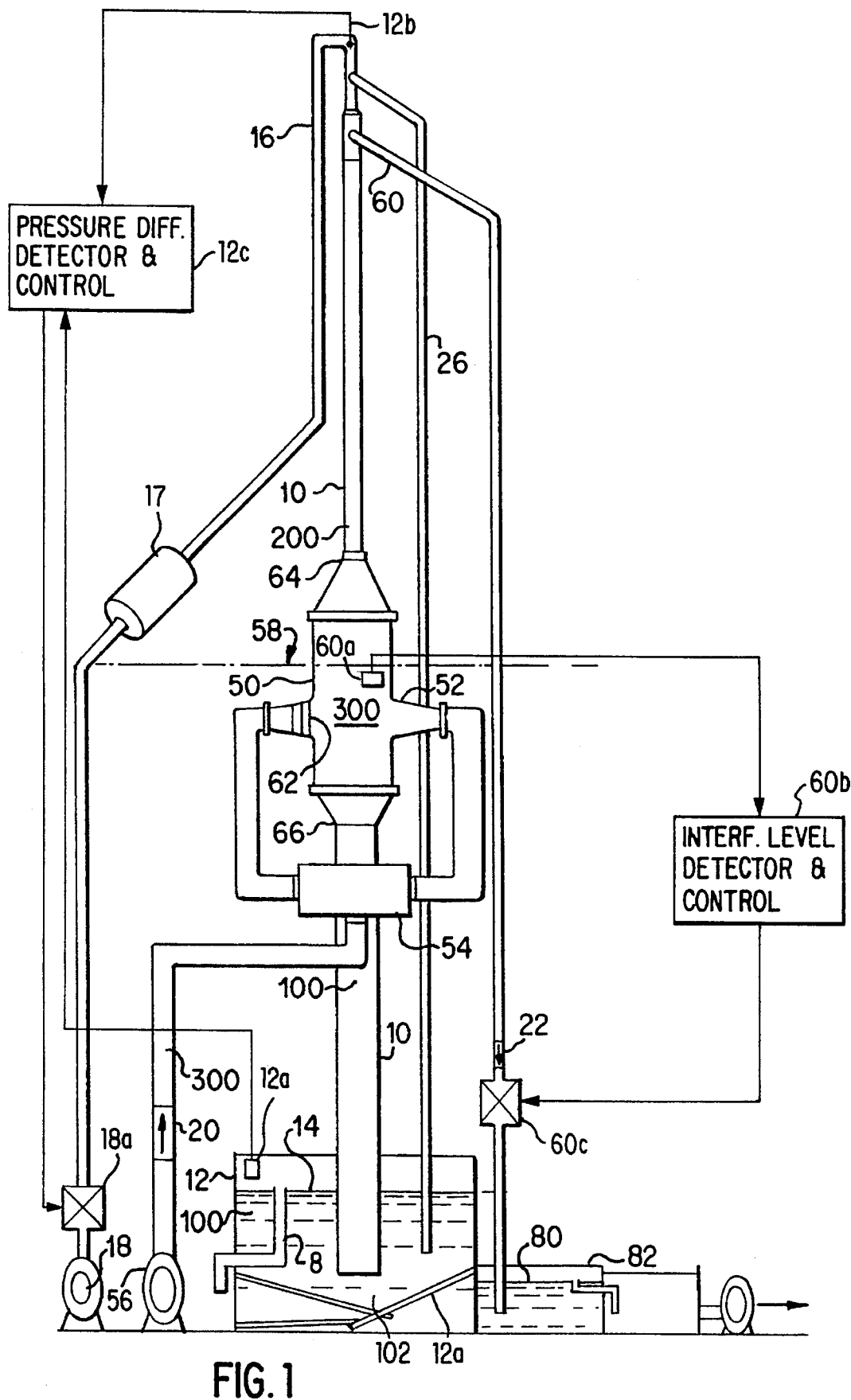
FIG. 1 is an over-all schematic diagram of apparatus embodying the invention.

Referring to FIG. 1, the present invention includes a vertical tube 10, the lower end of which is immersed in a reservoir 12 containing, in this example, water 100 filled to level 14. Reservoir 12 maintains a constant water level by means of a drain line 8. The reservoir 12 has a conical bottom 12a to trap any solids which settle to the bottom. A sludge gate 102 when opened allows removal of these solids.

A separation segment 50 is located in the mid-region of vertical tube 10. The placement of separation segment 50 is such that the interface level 58 of the two liquids which are to be separated—water and oil in this instance—lies within segment 50 and so do the nozzles 52 for injecting the mixture of water and oil to be separated.

A vacuum system is connected to the top of vertical tube 10 and comprises a vacuum line 16 which is in turn connected to a vacuum pump 18 via an accumulator 17.

Valves 20 and 22 are closed when starting the device. As an increasing partial vacuum is progressively drawn on vertical tube 10, both valves 20 and 22 are kept closed. After the water has been drawn to start-up level 24 in vertical tube 10, as viewed through sight gauge 26, the system is ready for injection of the water and oil mixture 300.

The oil and water mixture 300 is charged to the separation segment 50 through a plurality of injection nozzles 52 spaced around the periphery of segment 50 and having orifices which impart to the mixture an upwardly angled flow into segment 50. Mixture 300 is injected into separation segment 50 at a location close to but below the liquid interface level 58. This takes advantage of the following characteristics. Water and oil have different viscosities, oil being the more viscous of the two. Therefore, when water is injected into oil, the water will descend relatively slowly through the more viscous oil. By contrast, when oil is injected into water, the oil will rise relatively quickly through the less viscous water. By injecting the mixture 300 below the liquid interface level 58, i.e. where the separated liquid is mainly water, the relatively quick rise of the oil toward the liquid interface level 58 contributes to rapidity of separation. On the other hand, the water does not need to descend (relatively slowly) through the oil above the interface level 58, as would be the case if mixture 300 was instead injected at a location above that interface level, in which case the rate of separation would necessarily be reduced. By keeping the injection nozzles below, but close to the interface level 58, the upward path which oil in mixture 300 must follow on its way to the interface level 58 is kept short, which further contributes to quick separation.

Valve 20 is opened and the mixture is pumped by diaphragm pump 56 to accumulator 54 in series to reduce flow variations. Upon injection of mixture 300 into separation segment 50, the water 100 which was initially present will be progressively displaced by the mixture 300 and upon separation thereof, an equilibrium will be achieved; the lighter oil 200 occupying the upper portion of tube 10, the heavier water 100 occupying the lower portion. The two separated liquids will interface at level 58. In accordance with the present invention, this interface level 58 is controlled, as explained below, so as to remain at a substantially fixed location in separating segment 50 of the tube 10.

As injection of mixture 300 continues, oil is removed through evacuation conduit 60 connected near the top of vertical tube 10 while displaced water is discharged through the submerged end of vertical tube 10 into reservoir 12.

In order to maintain the oil and water interface level substantially fixed, as previously mentioned, several parameters need to be controlled as described below.

First, variations in the pressure difference between the top and bottom of tube 10 need to be detected and substantially compensated. To that end, the pressure on the surface 14 of the liquid (water) in reservoir 12 is measured by sensor 12a and that in the top of tube 10 is measured by sensor 12b. The difference between these pressures is determined by detector-and-control module 12c, which then controls modulating valve 18a so as to maintain that pressure difference substantially constant. Vacuum pump 18 can therefore be left running continuously, with control of pressure difference being accomplished by valve 18a.

Accumulator 17 connected between valve 18a and the top of tube 10 serves to smooth out possible fluctuations in the vacuum drawn at the top of tube 10.

Secondly, deviations in the actual location of interface level 58 from its desired location are detected and also substantially compensated. This may be accomplished by means of a sensor 60a positioned in the vicinity of this interface level and capable of sensing variations in its location up or down within tube 10. These sensed deviations from a predetermined value are supplied to a detector-and-control module 60b which, in turn, controls the opening and/or closing of modulating valve 60c connected in oil evacuation conduit 60. Specifically, when sensor 60a reports a lowering of the interface level 58 inside separating segment 50 of tube 10, valve control 60b responds by opening valve 60c wider, while a rise in the interface level 58 causes a reduction in the valve opening.

Cooperatively, the above-described sensing, detection and valve means accomplish the desired control functions in accordance with the present invention.

Specifically, the maintenance of a substantially constant pressure difference between tube 10 and bottom provides the conditions for establishing water and oil columns of predictable heights within tube 10, under what one might call "steady-state" conditions. By this is meant the column heights of water and oil respectively which a particular pressure difference is capable of maintaining in tube 10.

Referring to FIG. 2, this shows three different steady state conditions which can prevail in an illustrative case.

Figures 2A, 2B, 2C:
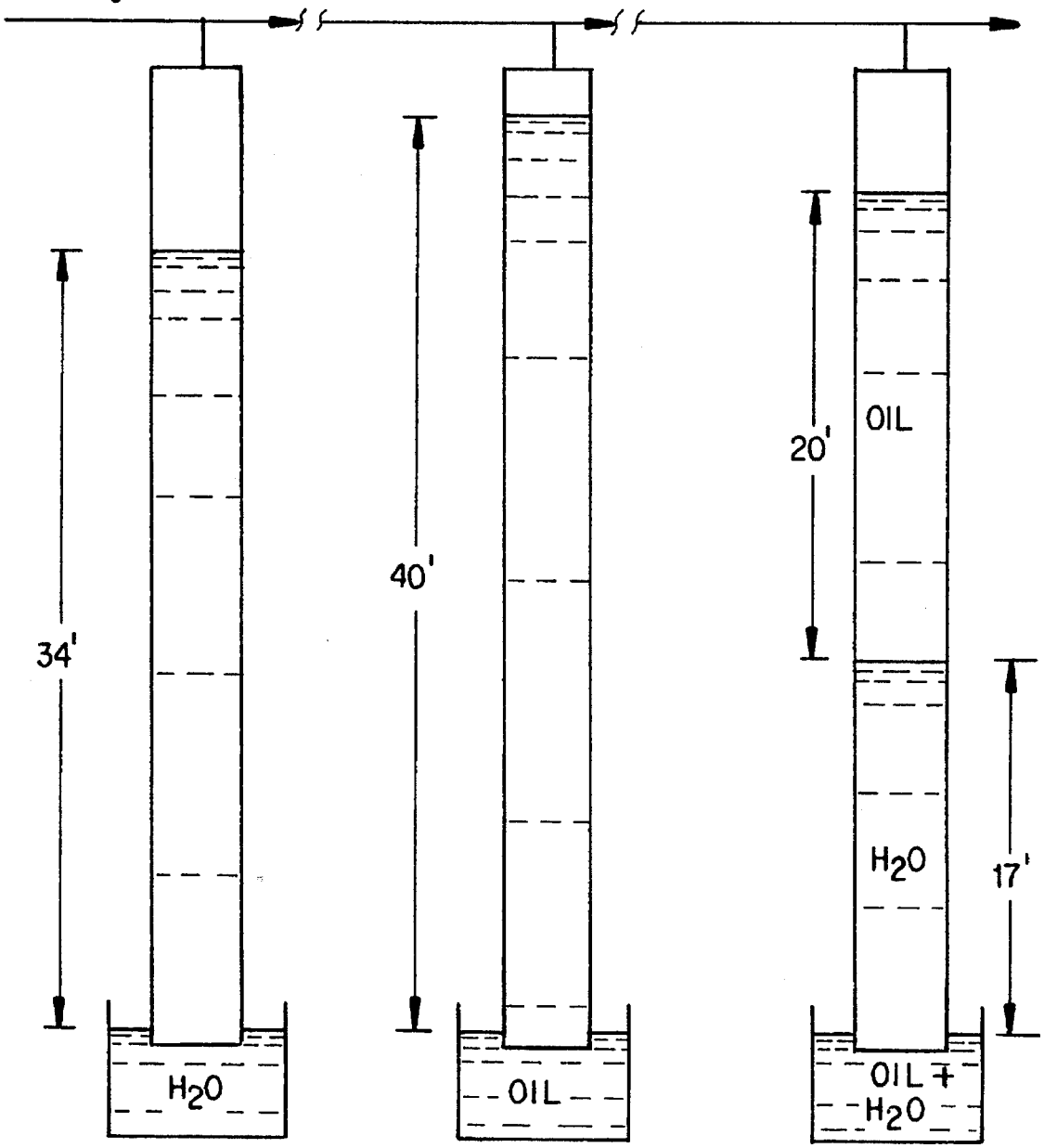
FIG. 2 is a diagrammatic illustration of certain principles underlying the present invention.

The portion of FIG. 2 designated as FIG. 2A shows schematically a tube whose open bottom is immersed in water at standard atmospheric pressure (29.95 inches Hg) and at whose top a perfect vacuum has been created. Such a pressure difference can support a water column 34 feet high.

FIG. 2B shows the corresponding condition for oil. Assuming oil at the lighter specific gravity of 0.85, the same pressure difference can support a 40 foot oil column.

Finally, FIG. 2C shows that, starting from a mixture of water and oil, there can be supported a column 37 feet high (i.e. between the water-only and the oil-only heights) of which the lower 17 feet will be the heavier water, and the upper 20 feet will be the lighter oil.

It should be understood that FIG. 2 shows an idealized situation, in that a perfect vacuum is assumed to exist at the top of the tubes. In reality, it would be excessively costly to come close to such a condition and more typically, a reduced pressure of perhaps 5 or 6 inches Hg would be provided at the top of the tubes. The heights of the various liquid columns shown in FIG. 2 would then be correspondingly reduced, and the location of the interface in FIG. 2C would also go down.

Likewise, if the oil were of a different grade than assumed in FIG. 2, and therefore of a specific gravity different from 0.85, this would lead to corresponding changes in the liquid column heights of FIGS. 2B and 2C.

Indeed, any two liquids of different specific gravities would give rise to their own set of column heights under various pressure conditions.

It is apparent that these same considerations apply to the apparatus of FIG. 1.

Also, in a practical embodiment of the invention, the pressure at the bottom of tube 10 (corresponding to that on the surface 14 of the water in reservoir 12) would not remain constant. Rather, this surface 14 would be exposed to the ambient air and would, therefore, be subject to variations in atmospheric pressure. If the top of tube 10 were left at an unchanged pressure during these variations, it is clear that the interface level 58 would experience substantial up or down variations.

It is to prevent variations in the interface level 58 of FIG. 1 from these causes that the pressure difference in the apparatus of FIG. 1 between top and bottom of tube 10 is kept substantially constant, in accordance with the invention.

Given such maintenance of the pressure difference, it would appear at first blush that it might not be necessary to separately control the location of the interface level 58.

However, something else takes place in that apparatus which is also capable of causing variations in the interface level. That something else is the continued injection of mixture 300 into separation segment 50. As the water and oil in that mixture 300 separate (with oil rising to the top), the progressive accumulation of the oil column 200 will exert increasing downward pressure on the water column 100, and with it increasing outflow of water into reservoir 12. This, in turn, will cause a downward displacement of the interface level 58. By sensing such a downward displacement, and increasing the opening of valve 60c in response, more oil is withdrawn from the top of the oil column 200 through oil outlet conduit 60. This returns the interface level 58 back to its desired location. Conversely, if less oil is separated, the interface level will tend to rise, the opening of valve 60c will decrease, and the oil column 200 will be able to build up, thereby again returning the interface level 58 to its desired location in segment 50 of tube 10.

Thus, in accordance with the invention, there is cooperation between the vacuum control apparatus and the oil evacuation control apparatus which provides the desired functioning of the over-all separating system.

Referring again to FIG. 1, in order to facilitate the removal of oil 200 through oil evacuation conduit 60, a negative pressure slightly greater than that applied through vacuum conduit 16 may be applied. This negative pressure may be obtained through the use of a siphon. The opposite end of evacuation tube 60 is shown immersed in oil having a level 80 in a reservoir 82. By positioning the level 80 of the oil 200 sufficiently below the water level 14 in reservoir 12, a siphon effect is created so that oil may be drawn from vertical tube 10, under the control of valve 60c.

Alternatively, a pump (not shown) may be used instead of a siphon. This would be especially desirable if physical size restrictions make it impractical to position the oil level 80 in reservoir 82 sufficiently below the water level 14 in reservoir 12 to obtain a siphon effect.

Some additional features of the invention also should be noted.

First, it is a feature of the invention that the flow of mixture 300 within separation segment 50 be as slow and non-turbulent as practical. It is to this end that this separation segment is made wider than the portion of tube 10 above and below it. It is also to this end that the injection nozzles 52 are made wider at the ends closest to the segment 50 and are oriented so as to inject the mixture at an upward angle. Incidentally, accumulator 54 contributes by smoothing out fluctuations in mixture flow.

The slowness of this flow gives the oil and water more time to separate; the freedom from turbulence permits this separation to occur without disruption.

Another feature is that the injection of mixture 300 close to interface level 58 causes the mixture at injection to be at the relatively low pressure which prevails at that location. This permits gases which may be trapped within the individual oil droplets in the mixture to expand and increase the dimensions of these droplets. It can be shown that the upward velocity of oil droplets in water increases with increasing droplet size. Thus, the separation rapidity is promoted.

Likewise, screens 62 inside injection nozzles 52 cause individual oil droplets to "hang up" temporarily on these screens, thereby coalescing with other such droplets, and so also increasing droplet size and with it separation rapidity. Such screens may be made, for example, of polypropylene.

Many variations in the apparatus of FIG. 1 may be made without departing from the inventive concept.

For example, for most complete separation of oil and water, it is desirable to have the water and oil portions 100 and 200 as tall as possible, so as to yield the purest products at their respective discharge ends. This obviously entails a tube 10 of considerable over-all height, typically in the vicinity of 35 feet above level 14 in reservoir 12. Sometimes, such tube height is prohibitive, due to height restrictions imposed by the building which houses the apparatus, or because it is desired to make the apparatus easily transportable, so that it can be moved close to the source of the mixture rather than having to transport the mixture to the apparatus. In such cases the pressure difference between top and bottom of tank 10 is reduced (by reducing the vacuum drawn at the top) until the considerations discussed in connection with FIG. 2 result in a liquid column which fits within the available height of tube 10.

Figure 3:
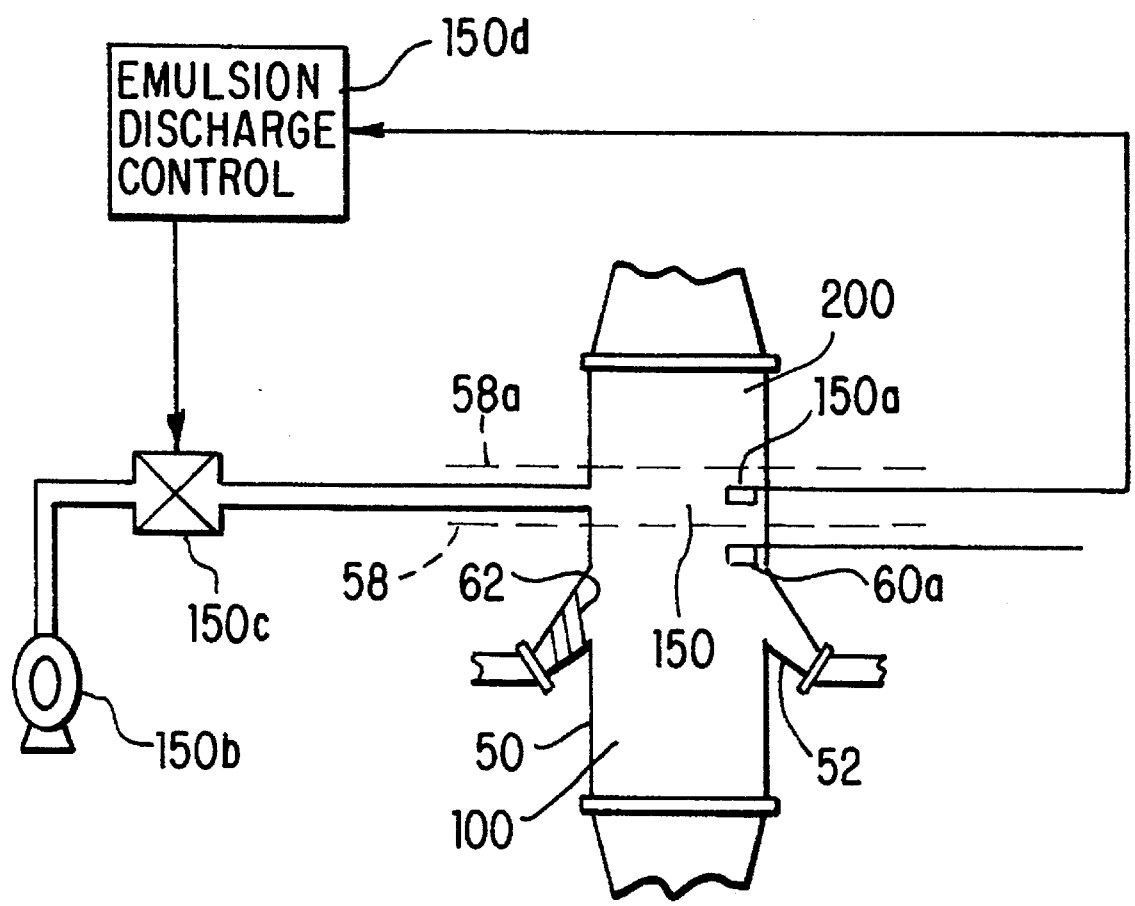
FIG. 3 is a fragmentary schematic diagram of another embodiment of the invention.

It sometimes happens that oil-and-water mixture does not separate "cleanly" into a water portion 100 and an oil portion 200, as shown in FIG. 1. Rather, there may arise an intermediate portion consisting of an emulsion of oil and water. This is illustrated in FIG. 3 of the drawings, where there is shown a fragment of apparatus like that in FIG. 1, namely a portion of the separation segment 50. As shown in FIG. 3, there is now not only one interface level 58, with the water portion 100 below that level and oil above it, but there is now immediately above that interface level 58, a short column 150 consisting of an emulsion still containing both oil and water. The oil portion 200, itself, then starts above a higher level 58a which marks the top of emulsion column 150. This emulsion column 150 forms somewhat like the foam on beer, as a result of the injection of mixture 300 and the bubbling-up action of oil from that mixture toward oil column 200. This tends to occur especially at high injection rates.

When such a column 150 of significant height does form, then it is preferable to provide a sensor 150a for its location, as well as an outlet close to but above interface level 58, through which that emulsion is withdrawn by a pump 150b connected to a valve 150c controlled by emulsion discharge control 150d, whenever sensor 150a indicates the presence of such a significant emulsion height. For example, a permissible emulsion height might range between 3 and 12 inches, with the sensor 150a activating the withdrawal pump 150b when a height of 12 inches is reached and deactivating it when that height is reduced to 3 inches or less.

Alternatively, a siphon may be used for such emulsion withdrawal, with the sensor 150a controlling the opening and closing of a valve in the siphon discharge path.

The various sensors, detectors and controls which are used in apparatus embodying the invention may all be of known conventional forms. For example, the pressure sensors 12a and 12b may obviously be of any desired conventional type for sensing gas pressure. The interface level sensor 60a and, if used, the emulsion level sensor 150a (FIG. 3) may also be of any conventional type for sensing liquid levels at interface 58 and interface 58a (FIG. 3). The detector-and-control circuits 12c, 60b and, if used, 150d (FIG. 3) may be of any conventional form for transforming the output signals from the respective sensors into control signals for modulating valves or pumps, as the case may be. Therefore, these elements of the apparatus are not further described.

Although less desirable, under certain circumstances the interface level sensor 60a of FIG. 1 may be omitted and, with it, also detector-and-control 60b. That could be the case, for example, if it were known what the highest possible specific gravity would be of any oil to be processed. In such a case, one can calculate in advance the lowest possible location of interface level 58 for the chosen top-to-bottom pressure difference (which is maintained substantially constant in accordance with the invention). Having done so, the injection nozzles 52 can be located below that lowest calculated location. As a result, the interface level 58 would always remain above the mixture injection height, thereby achieving the advantages which follow from this relationship. However, while so remaining above the injection height, the level 58 could now move up or down depending on fluctuations in specific gravity of the oil being processed. As result, the efficiency of the system can vary during operation.

Up to this point, the invention has been described in terms of separating two liquids, e.g. oil and water. However, it should be understood that it may also be applied to the separation of more than two liquids which have different specific gravities from one another.

Indeed, theoretically any number of liquids could be separated from one another provided that the differences between their specific gravities are adequate to ensure separation in the vertical tube space available.

Figure 4:
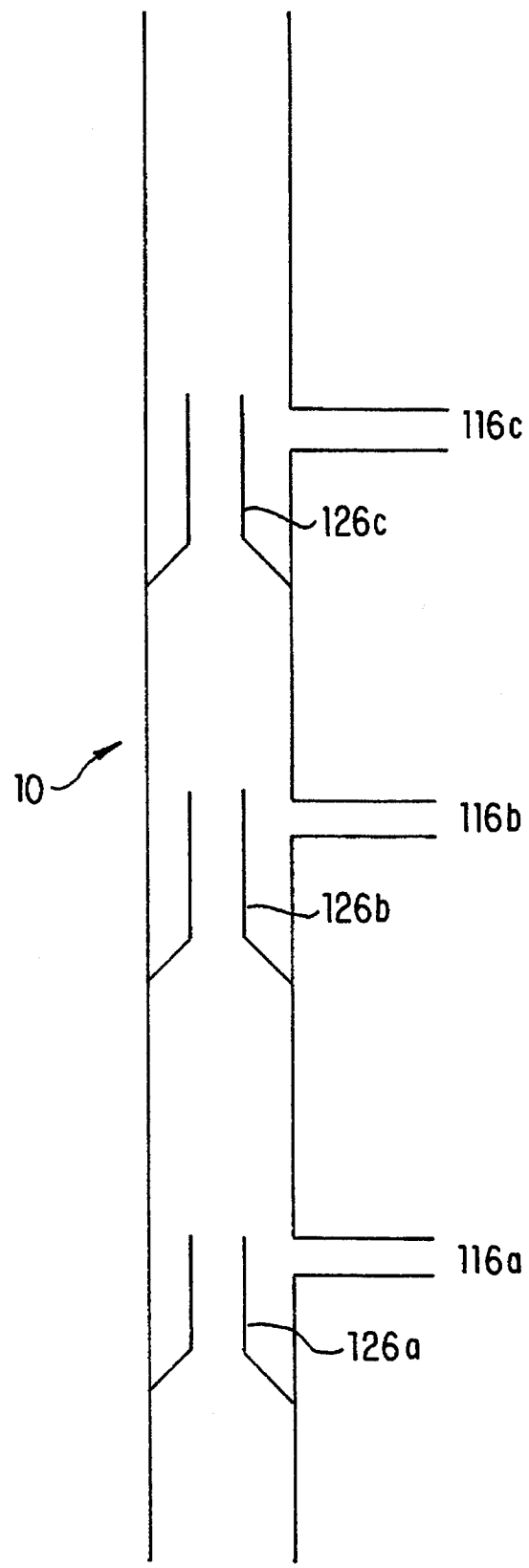
FIG. 4 is a fragmentary schematic diagram of still another such embodiment.

Referring to FIG. 4, this shows the invention as applied to a situation in which four such liquids are to be separated. Thus, FIG. 4 shows the upper portion of vertical tube 10, but now with three evacuation tubes 116a, 116b, 116c, instead of only one such evacuation tube, as in FIG. 1. In this FIG. 4 embodiment, a mixture of four fluids is injected into the apparatus through injection nozzles 52 (not shown in FIG. 4). The heaviest liquid will descend into the lower portion of vertical tube 10 (see FIG. 1). However, whereas in the FIG. 1 embodiment a single liquid rose into the upper portion of vertical tube 10, in the FIG. 4 embodiment the three other liquids will so rise. In so doing, they will in turn separate from each other due to their different specific gravities and will accumulate in three distinct columns, one above the other. Of those three liquids, the heaviest will be drawn out through evacuation tube 116a, while the next lighter will be drawn out through evacuation tube 116b and the lightest liquid will be drawn out through evacuation tube 116c. Each section of tube 10 associated with these respective three liquids has an inner vertical tube 126a, 126b and 126c, respectively. These internal tubes create regions within tube 10 for the respective separated liquids to collect before exiting through their respective evacuation tubes 116a, 116b and 116c.

In this embodiment of FIG. 4, as in that of FIG. 1, the pressure difference between the top and bottom of tube 10 is maintained substantially constant. In addition, the locations of the individual interface levels between the columns of different density liquids are also maintained substantially constant. That is accomplished by equipping the location of each such interface with a detector corresponding to detector 60a of FIG. 1, and also providing for each of the three evacuation tubes a modulating valve corresponding to valve 60c of FIG. 1, controlled by respective interface level detector-and-control modules corresponding to detector-and-control module 60b in FIG. 1.

Although the present invention has been described with reference to particular embodiments herein set forth, it is understood that the present disclosure has been made by way of example only and that numerous changes in the details of construction may be resorted to without department from the spirit and scope of the invention. Also, the invention is obviously not limited to water-and-oil separation, but can be applied to other liquid mixtures in accordance with its teachings. Thus, the invention should not be limited by the foregoing specification, but rather only by the scope of the Claims appended hereto.

What is claimed is:

1. A system for separating two liquids having different specific gravities which comprises:
   a substantially vertical tube whose lower end communicates only with a liquid having substantially the higher specific gravity of said two liquids to be separated and exposed to a first pressure;
   means for establishing and maintaining in the top of said tube a second pressure which is substantially lower than said first pressure;
   means for controlling the difference between said first and second pressures so as to define a level within said tube below which separated liquid of the higher specific gravity will be supported and above which separated liquid of the lower specific gravity will be supported by said pressure difference;
   means for jointly introducing said liquids to be separated into said tube in the vicinity of said defined level; and
   means for withdrawing said higher specific gravity liquid near the bottom and said lower specific gravity liquid near the top of the tube, while preserving said pressure difference,
   said pressure difference controlling means including pressure sensors at the top and bottom of said tube, and means for responding to said sensors to maintain said pressure difference substantially constant.

2. The system of claim 1 wherein said introducing means is located close to, but below said level.

3. The system of claim 1 further comprising means for maintaining said level substantially constant, over substantial variations in the rate of introduction of said liquids.

4. The system of claim 1 further comprising means for maintaining said level substantially constant, over substantial variations in the proportions of said liquids being jointly introduced.

5. The system of claim 1 further comprising means for maintaining said level substantially constant, over substantial variations in the rate of introduction and of the proportions of said liquids being jointly introduced.

6. The system of claim 5 wherein said level maintaining means includes means for sensing variations in said level, and means for varying the rate of withdrawal of said lower specific gravity liquid in response to said variations so as to substantially counteract said level variations.

7. The system of claim 6 wherein said means for varying the withdrawal rate includes an evacuation conduit connected to said pipe near the top, means for establishing at said conduit a pressure slightly lower than at the top of said pipe, and a modulating valve in said conduit controlled in response to said sensing of level variations.

8. The system of claim 1 wherein a vacuum pump is connected to the top of the tube and a modulating valve is connected between said pump and the top of the tube.

9. The system of claim 1 wherein said tube includes an enlarged central segment and said defined level is located within said enlarged segment.

10. The system of claim 9 wherein said liquid introducing means includes a plurality of orifices spaced around the periphery of said enlarged tube segment.

11. The system of claim 10 wherein said orifices are located at the ends of pipes which have a cross-section which widens in the direction of the tube.

12. The system of claim 10 wherein the orifices are oriented so as to introduce the liquid into the tube in an upwardly angled direction.

13. The system of claim 10 wherein screens are disposed inside said orifices.

14. A system for separating two liquids having different specific gravities which comprises:

a substantially vertical tube whose lower end communicates only with a liquid having substantially the higher specific gravity of said two liquids to be separated and exposed to a first pressure;

means for establishing and maintaining in the top of said tube a second pressure which is substantially lower than said first pressure;

means for controlling the difference between said first and second pressures so as to define a level within said tube below which separated liquid of the higher specific gravity will be supported and above which separated liquid of the lower specific gravity will be supported by said pressure difference;

means for jointly introducing said liquids to be separated into said tube in the vicinity of said defined level;

means for withdrawing said higher specific gravity liquid near the bottom and said lower specific gravity liquid near the top of the tube, while preserving said pressure difference, said tube including an enlarged central segment and said defined level being located within said enlarged segment; and means for maintaining said level substantially constant, over substantial variations in the rate of introduction and of the proportions of said liquids being jointly introduced, said level maintaining means including means for sensing variations in said level, and means for varying the rate of withdrawal of said lower specific gravity liquid in response to said variations so as to substantially counteract said level variations, said means for varying the withdrawal rate including an evacuation conduit connected to said pipe near the top, means for establishing at said conduit a pressure slightly lower at the top of said pipe, and a modulating valve in said conduit controlled in response to said sensing of level variations, for establishing a slightly lower pressure being a pump.

* * * * *